TANDEM TESTING OF TELEPHONE LINES

Filed Jan. 22. 1968 5 Sheets-Sheet 1

INVENTOR
W. CHULAK
AGENTS
Curphey & Erickson

INVENTOR
W. CHULAK
AGENTS
Curphey & Erickson

INVENTOR
W. CHULAK
AGENTS
Curphey & Erickson

INVENTOR
W. CHULAK

AGENTS
Curphey & Erickson

INVENTOR
W. CHULAK
AGENTS
Curphey & Erickson

United States Patent Office 3,506,794
Patented Apr. 14, 1970

3,506,794

TANDEM TESTING OF TELEPHONE LINES

William Chulak, Chambly, Quebec, Canada, assignor to Northern Electric Company Limited, Montreal, Quebec, Canada Filed Jan. 22, 1968, Ser. No. 699,561
Int. Cl. H04m *3/26*
U.S. Cl. 179—175.2 5 Claims

ABSTRACT OF THE DISCLOSURE

This invention relates to tandem testing of telephone offices located within a limited distance from a remote office equipped for remote testing. Such testing is carried out under the control of a test desk located at a test center, through, the remotely controlled office, and over a direct current trunk between the remotely controlled office and the other office located within a limited distance of the remotely controlled office.

This invention relates to remote testing of subscriber telephone lines and more particularly to tandem testing of offices located within a limited distance from a remote office equipped for remote testing.

To ensure a high standard of telephone service, telephone lines must be tested regularly. Local test desks are usually provided in test centers for providing the necessary tests. Until recently, most of the testing was done using a dedicated direct current trunk between the test center and each of the various test trunk circuits in the office being tested. The operating range of the relays used, however, limits the length of these test trunks. Lately, remote testing circuits have been developed that eliminate the distance limitations between the test center and the tested offices. These circuits provide essentially a remotely controlled version of the test desk in each office tested. The remote test circuit is controlled by the regular test keys at the test desk using alternating current signals transmitted over a voice-frequency test path. The test results are returned to the test desk by supervisory and telemetry signals over the same test path.

However, in areas where there are plural offices within a limited distance, it would be more economical to test such offices through a single remote office equipped with the remote testing equipment. Tandem testing of plural offices through a single office equipped with the remote testing equipment would eliminate the need of providing the costly remote testing equipment for each remote office.

It is, therefore, the main feature of the present invention to allow tandem testing of a plurality of offices located within a predetermined distance from a remotely controlled office through the remote office. Such testing is carried out under control of the test desk over a direct current trunk between the remotely controlled office and the other offices.

The invention will now be described with references to the accompanying drawings in which.

Figure 1:
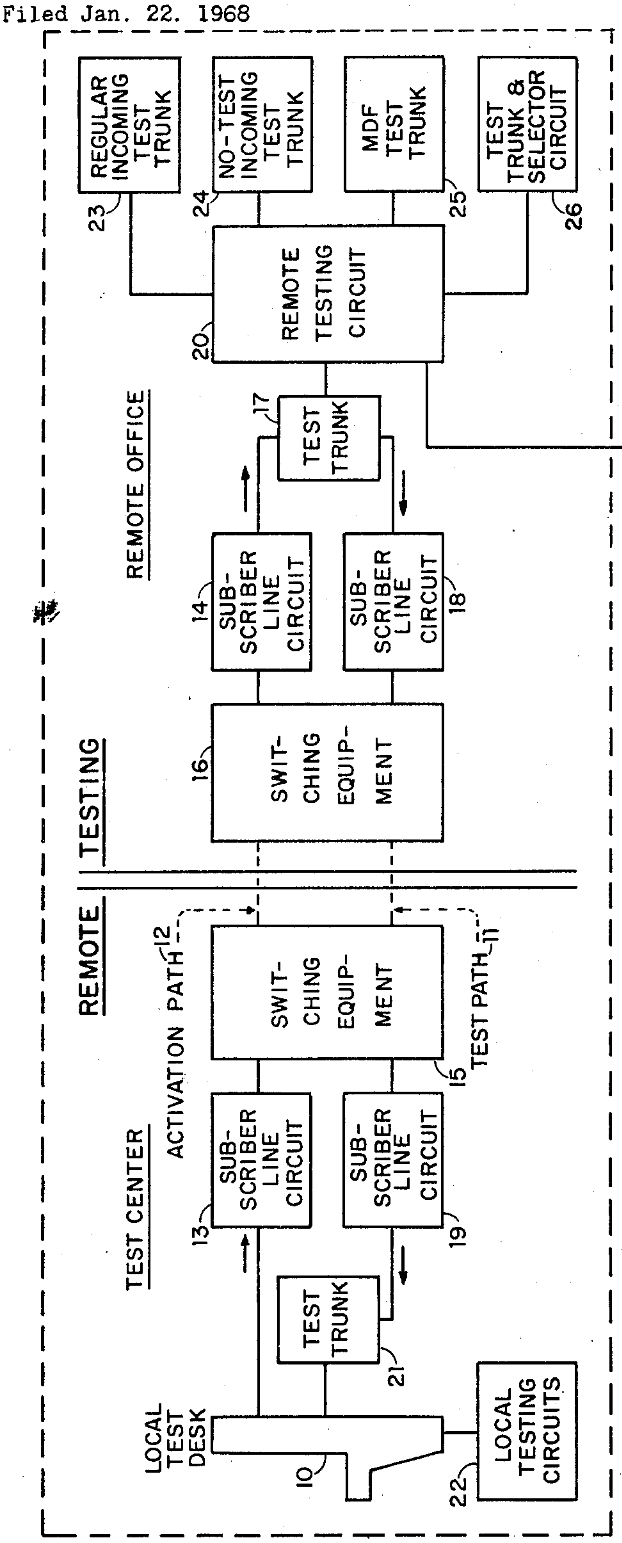
FIG. 1 illustrates a block diagram of a known remote testing system.

Referring to FIG. 1, there is shown a general block diagram of a known subscriber loop remote testing system. Generally speaking, the remote testing system is controlled by regular test keys at a test desk 10 using A.C. signals transmitted over a voice frequency test path 11. Test results are returned to the test desk by supervisory and telemetry signals over the same test path. The path can be a dedicated trunk, or more economically, it can be a nondedicated circuit dialed up through the regular telephone switching system.

To test a line in a remote office, the tester first establishes a connection from the test desk 10 to the remote testing circuit in the distant office. If a nondedicated trunk is used, the tester dials a connection to the remote office over an activation path 12 comprising subscriber line circuits 13 and 14 and switching equipments 15 and 16. This activates test trunk 17 at the remote office where a connection is automatically dialed over subscriber line circuits 18 and 19 from the remote testing circuit 20 to the test desk 10. The tester breaks the first connection over the activation path 12 and then conducts all testing over the test path 11. When the test path has been set up, the tester, completes the connection by plugging the test cord into the test jack of test trunk 21.

If a dedicated test path is used, the tester simply plugs a test cord into the test jacket of test trunk 21. The remote office test trunk 17 and activation path 12 are omitted.

The tester then selects a Test Distributor Control Circuit, a Regular Incoming Test Trunk, a No-Test Incoming Test Trunk, a Main Distributing Frame Test Trunk or a Test Trunk and Selector Circuit depending upon the type of office being tested and the kind of testing to be done. He makes the connection to the desired customer line in the normal manner by key pulsing or dialing. Remote testing circuits 22 translate these key operations into multifrequency control signals called order codes, consisting of various combinations of 3 out of 14 audio frequencies. The multifrequency control signals are transmitted to the remote office each time a key is operated and released. At the remote testing circuit 20, the multifrequency control signals are received and decoded to set up the appropriate test connections to Test Trunks 23 through 26.

The D.C. current measurements made at the remotely controlled office are translated to frequency modulated waves and transmitted back via test path 11 to testing circuits 22 at the test center. There the FM signals are demodulated and the resulting direct current signals are measured.

The above is a brief description of a known remote testing circuit, a more detailed description of which may be found in the December 1966 issue of the Bell Laboratories Record.

Figure 2:
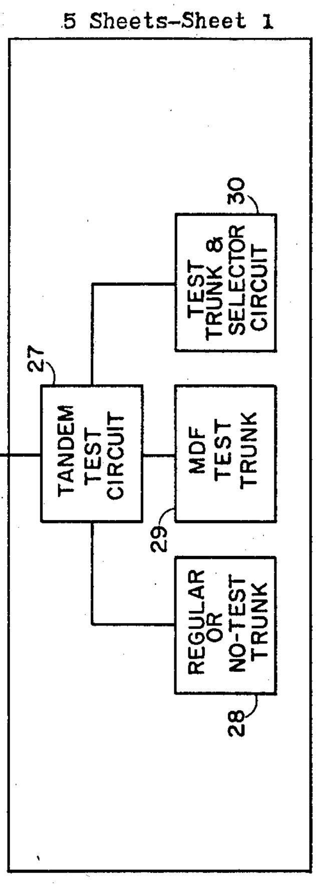
FIG. 2 illustrates in a block diagram form the additional circuitry required for providing tandem testing in accordance with the invention.

FIG. 2 illustrates in a block diagram form the additional circuitry required for testing several offices within a limited distance from a regular remotely controlled office. Generally speaking, when the tester has established a connection between the local test desk 10 and the remotely controlled office, a connection may be established to a tandem test circuit 27 by operating a special key at the local test desk. The tester can then proceed to dial the subscriber number in preparation to test out the subscriber line and/or telephone set. During the course of his testing, the test man may test a Regular or No-test Trunk 28, a MDF Trunk 29 or a Test Trunk and Selector Circuit 30 by operating the associated keys at the local test desk.

Figure 3:
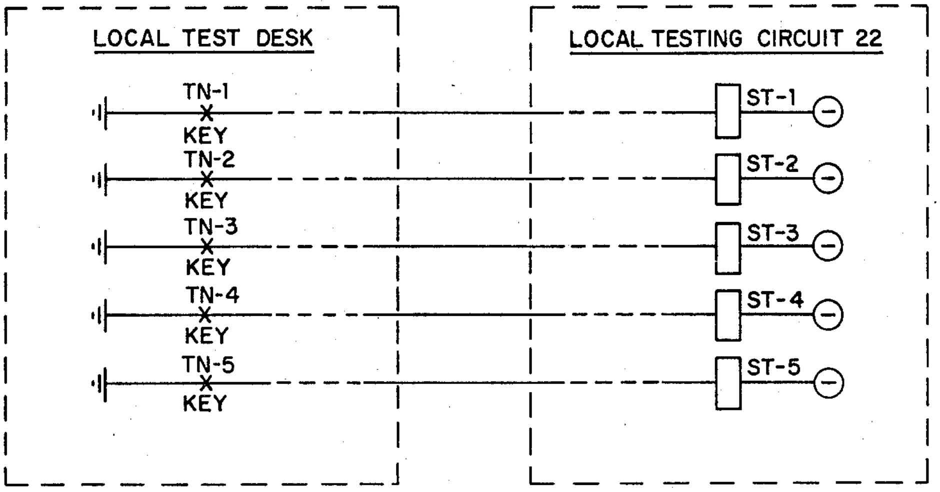
FIG. 3 illustrates additions to the known test desk and local testing circuit for providing tandem testing.

In FIG. 3, there are shown additions to be made to the conventional test desk 10 to provide the required keys TN for tandem testing, and to the local testing circuits 22 for providing the additional start relays ST for making the proper connections to the multitone generator which causes the appropriate order codes to be transmitted. The circuits are identical to the ones provided for the regular remote testing system and are shown schematically. A more detailed description thereof may be found in the above-identified Bell Laboratories Record at pages 371–374. There are five TN keys and five ST relays illustrated for providing tandem testing to five offices within a limited distance from the remotely controlled office. However, if there are more offices, more circuits may be added. The operation of any one of the keys TN–1 to TN–5 operates its corresponding relay ST–1 to ST–5 to start the appropriate multifrequency generator to send the order codes to the test path.

Figure 4:
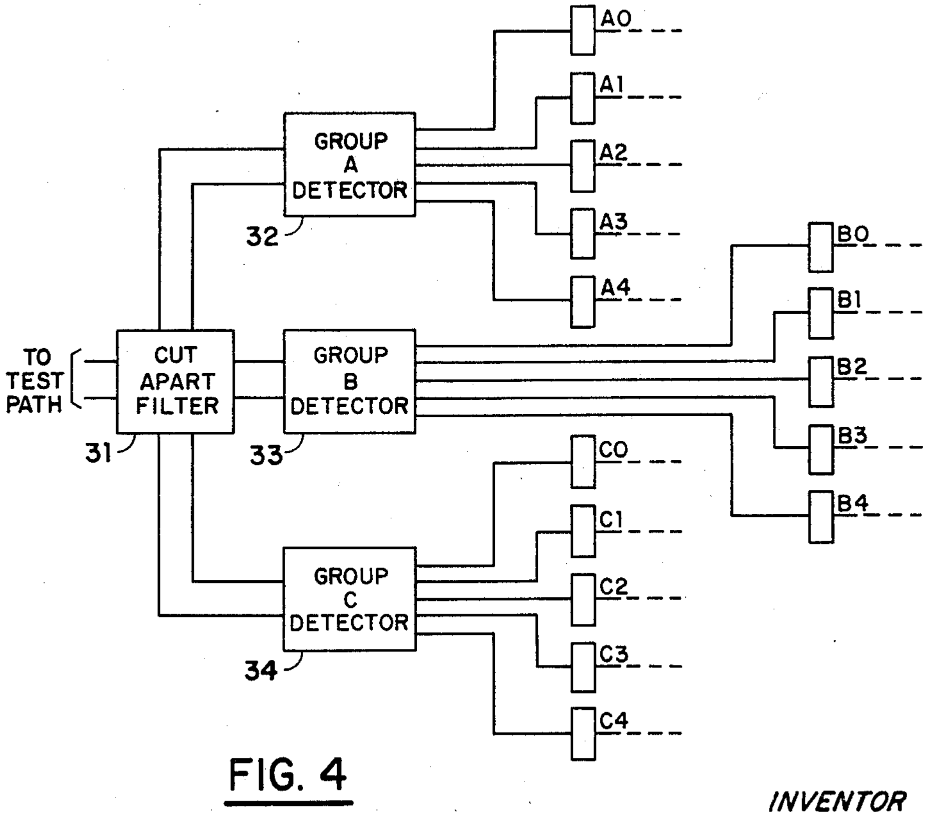
FIG. 4 illustrates a receiver circuit of the type used in the known testing system.

The order codes transmitted over test path 11 are received by a multifrequency receiver illustrated schematically in FIG. 4. A more detailed description of the receiver may be found in the above-identified Bell Laboratories Record at page 373. A cut apart filter 31 divides the order codes into three groups corresponding to the three frequencies generated by the multifrequency code generator. Each of these groups of frequencies is applied to a detector 32, 33 or 34 which detect the A, B or C frequencies. Each of these detectors is sharply tuned to the corresponding frequency and provides an output only when a signal of that frequency with a substantial amplitude appears at its input. The outputs of detectors A, B or C operate corresponding relays $A_0$–$A_4$, $B_0$–$B_4$ or $C_0$–$C_4$.

Figure 5:
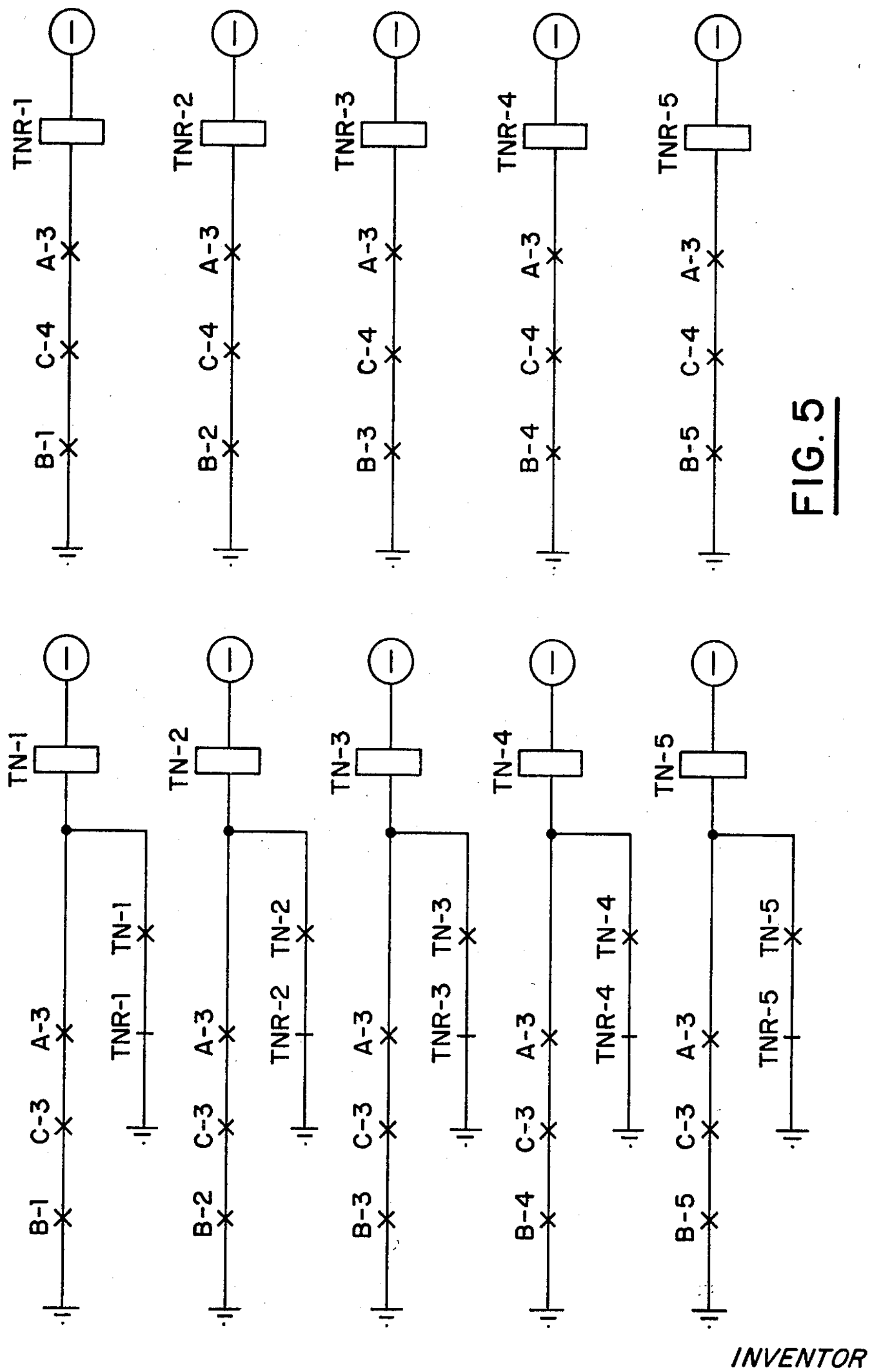
FIG. 5 illustrates a relay circuit for transferring the T, R, S leads from the Test Distributor Control Circuit of the remotely controlled office to one of the other offices in the area.

FIG. 5 illustrates relays TN–1 to TN–5 which are operated when the corresponding keys at the local test desk are operated and relays TNR–1 to TNR–5 which are operated when the keys TN–1 to TN–5 are released. Each of the relays TN–1 to TN–5 and TNR–1 to TNR–5 are operated in response to the simultaneous operation of one relay from each group of relays $A_0$–$A_4$, $B_0$–$B_4$ and $C_0$–$C_4$. In other words, each of relays TN–1 to TN–4 and TNR–1 to TNR–4 responds to a unique combination of A, B and C relays. Moreover, each of the operate relays TN–1 to TN–4 locks through a break contact of release relays TNR–1 to TNR–5.

Figure 6:
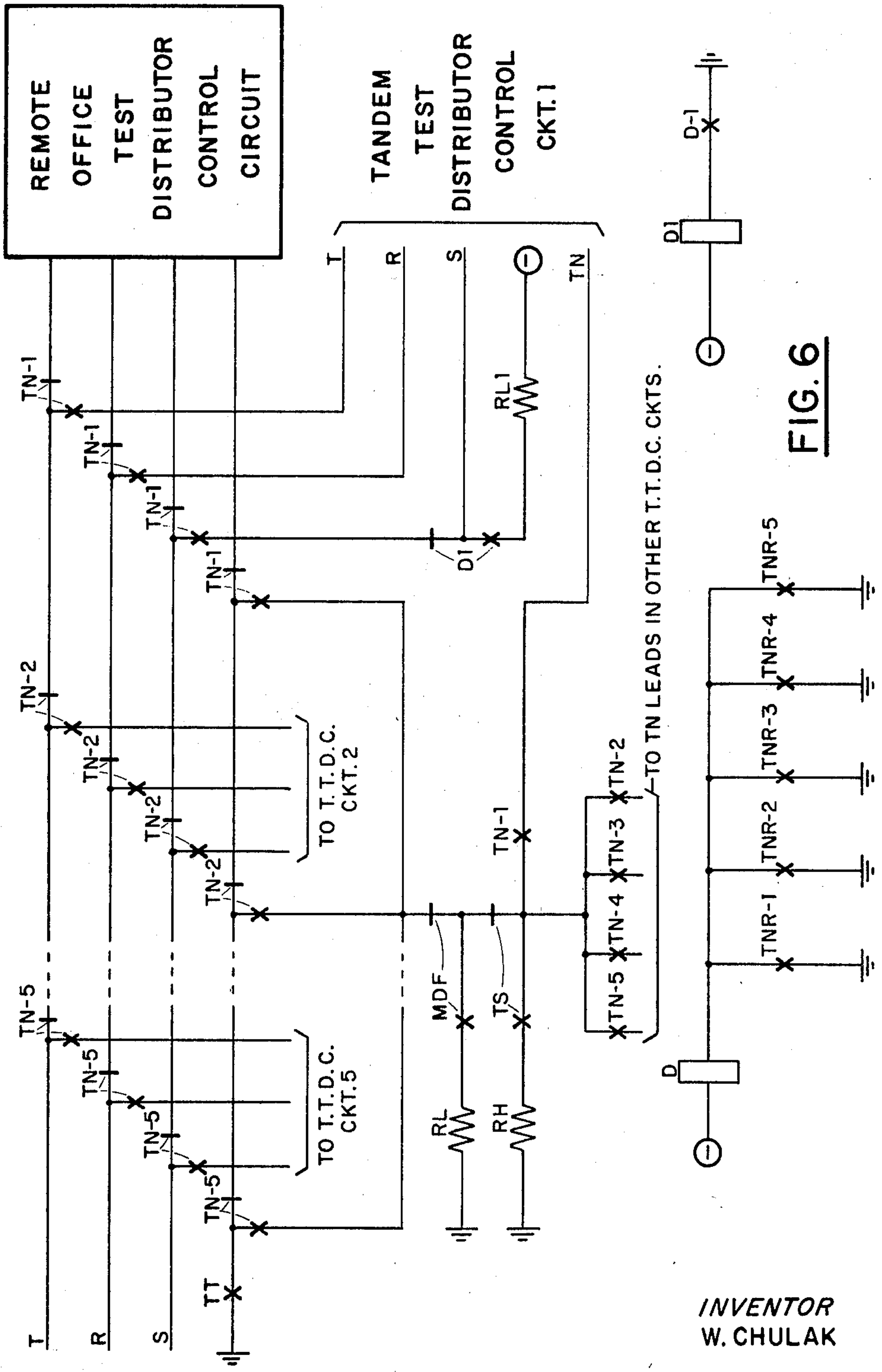
FIG. 6 illustrates the additions to the common remotely controlled office for providing tandem testing.

The operation of one of relays TN–1 to TN–5 close corresponding contacts TN–1 to TN–5 in FIG. 6 to transfer the T, R, S leads from the Test Distributor Control Circuit in the remotely controlled office to the Test Distributor Control Circuit in one of the other offices to be tested. The tester can now proceed to dial the subscriber number in preparation to test out the subscriber line and/or telephone set.

During the course of his testing, the tester may find that he will have to test a Touch Tone feature, a MDF Test Trunk and/or a Test Trunk and Selector Circuit for example. All these tests can be performed by operating associated keys TT, MDF or TS respectively at the local test desk. These keys will operate start relays to energize corresponding multifrequency generators to send appropriate frequencies over the test path to the remotely controlled office and eventually operate contacts TT, MDF or TS shown in FIG. 6.

Figure 7:
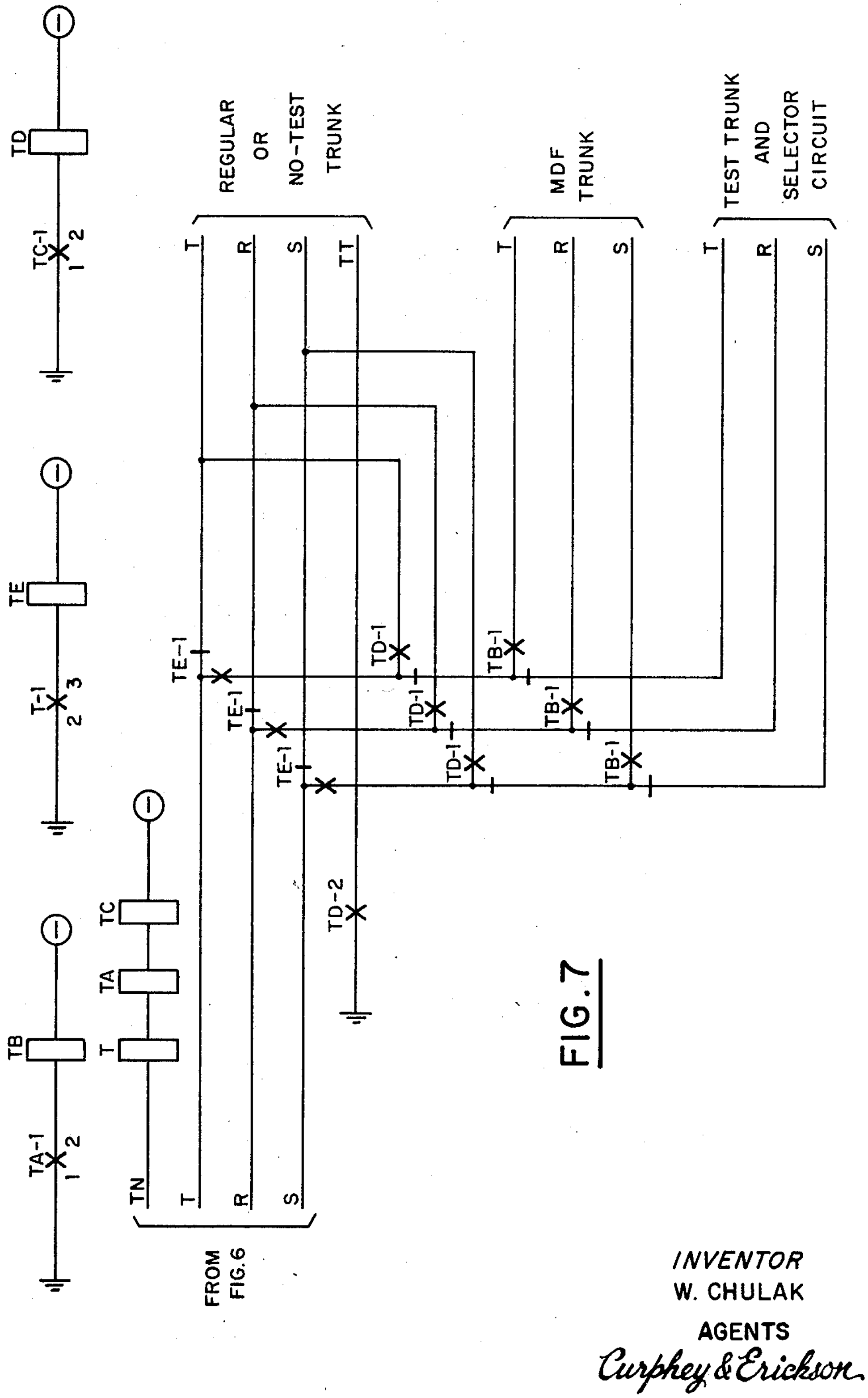
FIG. 7 illustrates the Test Distributor Control Circuit of one of the other offices to be tested.

The closure of contacts TT places a direct ground on supervisory lead TN to the office under test through normally closed contacts MDF and TS as illustrated in FIG. 6. The direct ground on supervisory lead TN operates relay T and marginal relays TA and TC in FIG. 7. The operation of relays T, TA and TC closes contacts T–1, TA–1 and TC–1 to operate relays TE, TB and TD. The energization of relays TE, TB and TD operate contacts TE–1, TB–1 and TD–1 to complete a circuit to the Regular or No-test Trunk and to test the Touch Tone Feature thereof by closing contacts TD–2.

The closure of contacts MDF places low resistance ground through resistor RL on supervisory lead TN to the Tandem Office through normally closed contacts TS to operate relay T and marginal relay TA. The operation of relays T and TA close contacts T–1 and TA–1 to operate relays TE and TB. The energization of relays TE and TB operates contacts TE–1 and TB–1 to complete a current to the MDF trunk.

The closure of contacts TS applies high resistance ground through resistor R4 to supervisory lead TN and operates relay T alone. The operation of relay T closes contacts T–1 and operates relay TE. The operation of relay TE completes a circuit to the Test Trunk and Selector Circuit.

On completion of testing the TN key under operation is released and the corresponding TNR relay, FIG. 5, is energized as mentioned previously. The operation of the corresponding relay TNR releases the operated TN relay and operates relay D, FIG. 6 which in turn operates relay D1. The operation of relay D1 will replace the usual high resistance ground on the sleeve S of the trunk under use with a lower resistance ground through resistor RL1. The lower resistance ground on the sleeve S will release the trunk as commonly known in the art.

Since the above described testing circuits use direct current connections between the remotely controlled office and the other office arranged for tandem testing a maximum 1500 ohms loop resistance is required which means that such other offices must be within a limited distance from the remotely controlled office.

What is claimed is:

1. A remote testing system for performing telephone subscriber direct current loop test comprising a test station, a remotely located office, means for establishing a test path to said remote office and for generating alternating current control signals for transmission over said path to said remote office, means at said remote office for translating said control signals into direct current loop tests, means for translating the test results into alternating current signals for transmission over said path to the test station, a plurality of other offices located within a limited distance from said remotely controlled office, and means under the control of said test station for testing said other offices over a direct current trunk between said remotely controlled office and each of said other offices.

2. A remote testing system as defined in claim 1 comprising a plurality of keys at said test station and a plurality of corresponding relays at said remotely controlled office responsive to the operation of said keys to connect said remotely controlled office to said direct current trunk for performing direct current loop tests at said other offices.

3. A remote testing system as defined in claim 2 further including means at said remotely controlled office under control of said test station for applying various supervisory signals over said direct current trunk for performing various direct current loop tests to said other offices.

4. A remote testing system as defined in claim 3 including a supervisory circuit comprising a number of relays connected in series and wherein said means for applying supervisory signals to said direct current trunk comprises means for varying the direct current loop resistance of the supervisory circuit for operating selected ones of said relays to connect various test trunks having access to the subscriber loops to be tested.

5. A remote testing system as defined in claim 4 wherein the maximum loop resistance of said direct current trunk is 1500 ohms.

References Cited

UNITED STATES PATENTS 3,410,966 11/1968 Davies -------------- 179—175

KATHLEEN CLAFFY, Primary Examiner

D. W. OLMS, Assistant Examiner